Figure 1:
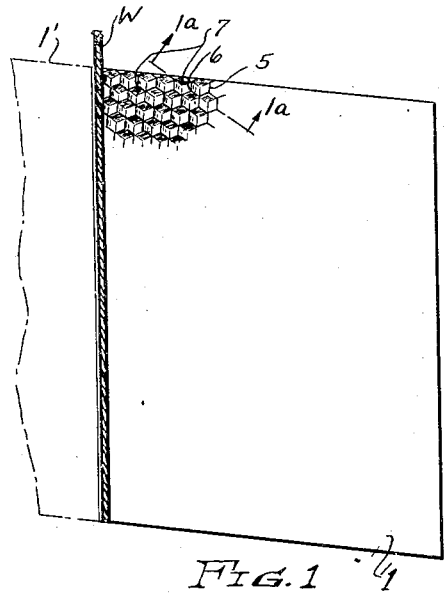

June 14, 1932. H. H. ROOT 1,863,416
CANDLE AND METHOD RELATING THERETO
Filed June 9, 1930 2 Sheets-Sheet 1

Inventor
Huber H. Root
By Bates, Golrick & Teare
Attorney

June 14, 1932. H. H. ROOT 1,863,416
CANDLE AND METHOD RELATING THERETO
Filed June 9, 1930 2 Sheets-Sheet 2
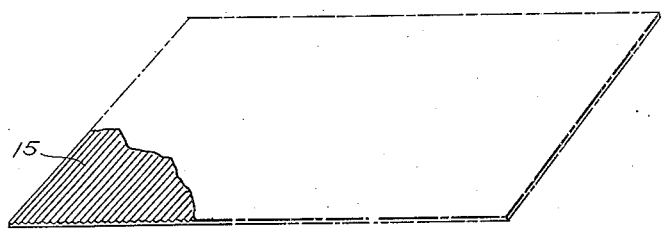
FIG. 8
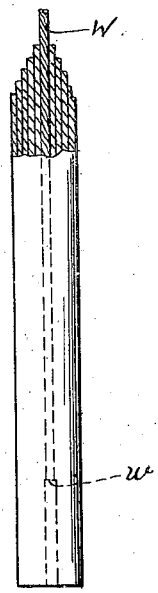
FIG. 7
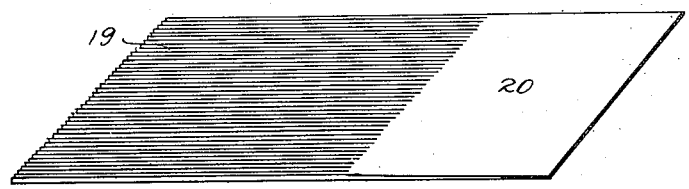
FIG. 9
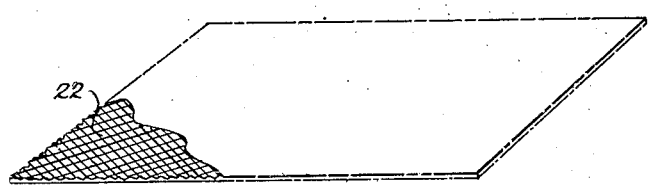
FIG. 10
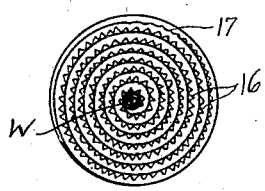
FIG. 8a
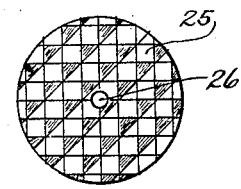
FIG. 11
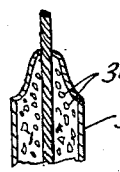
FIG. 13
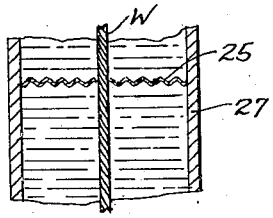
FIG. 12
FIG. 9a
Inventor
Huber H. Root
By Bates, Golrick & Faru
Attorney Patented June 14, 1932

1,863,416

UNITED STATES PATENT OFFICE

HUBER H. ROOT, OF MEDINA, OHIO, ASSIGNOR TO THE A. I. ROOT COMPANY, OF MEDINA, OHIO, A CORPORATION OF OHIO

CANDLE AND METHOD RELATING THERETO

Application filed June 9, 1930. Serial No. 459,867.

The objects of this invention include the provision of a new method of making candles, a new and improved candle, and a new method of lengthening the burning life of candles. Various other objects and novel aspects of the invention will become apparent from the following description relating to the accompanying drawings.

The drawings illustrate the preferred embodiments of the invention, the essential characteristics of which are summarized in the claims.

At the present time, there are, to my knowledge, three generally used methods of making candles. The more inexpensive candles are simply molded or cast. Other grades are formed by drawing the candles through successive baths of molten wax or subjecting them to successive spraying operations with molten wax, and still other grades are dipped, in the strict sense of the term. Where the wax is applied in successive layers, as by dipping, one or more of the outermost layers have been heretofore specially treated, as by the addition of carnauba wax, for example, to cause such layer or layers to have a higher melting point than the inner layers, with the result that such candles have longer burning life. The longer life is mainly due to the fact that a deeper cup is formed by the less readily melted exterior layers.

The present invention contemplates providing a candle that will have still longer burning life, for a given weight of candle, than candles made by any of the above mentioned methods. It further contemplates the provision of a candle having greater physical strength, particularly to resist bending under relatively warm temperatures, this being perhaps the greatest drawback to the use of present day candles.

Briefly, I propose to add to the burning life of the candle by making at least the inner portions of the solid fuel material, cellular (with entirely or substantially entirely disconnected pockets spaced either longitudinally thereof or radially thereof or both), whereby the candle will melt more easily closely adjacent the wick than toward the outside, thus keeping the base of the protruding portion of the wick well immersed in liquid fuel. Considered from another standpoint, the cellular structure provides for successively presenting open spaces to the melted material of the candle which will allow the melted material to penetrate the body of the candle rather than run down the outside surface, as so frequently happens with all present day candles. Further refinements include providing a central cellular body, and an outer non-cellular retaining shell, thereby maintaining a higher "brim" at all times, irrespective of whether the outer shell is specially treated to give it a higher melting point, although, of course, I contemplate to some extent, using different grades of material for the different portions of the candle, somewhat in accordance with known practices.

With regard to strengthening the candle, this is obviously done where the cellular structure is present, partly because of the tubular construction and resulting internal bracing and, further, because the air pockets have an insulating effect to impede penetration or transmission of external heat into the heart of the candle. The candle will, therefore, not be likely to bend over in a comparatively warm room. Further, I propose to form the body of the candle by wrapping or surrounding the wick with successive layers (in spiral effect) of rolled sheet wax or wax composition. Such layers are strengthened by the rolling operation, being rendered more dense than in the natural state of the material. The rolled sheet material, in the preferred form of the invention, is formed to provide cellular effects at the interior of the candle and substantially non-cellular effects exteriorly. However, from the standpoint of strengthening the candle only, the layers may be uniform throughout, plain or embossed to form the cells or cavities, or a single sheet of material may have both plain and embossed effects, as will be more fully described below.

In the preferred commercial form of candle, the embossed wax (comb foundation) results in the provision of cells or air pockets which are substantially disconnected from each other, the walls of which are thin and angularly disposed with reference to each other, presenting points and surfaces which quickly melt as the candle burns down to them. As these points and surfaces melt, new disconnected air pockets with their points and surfaces are exposed. With this cellular construction, the wax, of course, tends to melt faster in the center of the candle, making a deep cup or crater to receive the melted wax and thereby reduce the tendency for the melted wax to run over the edge. The more dense outer shell of the preferred commercial form of candle—the unembossed finishing layer or envelope—further tends to decrease running over, as has been mentioned.

Figure 2:
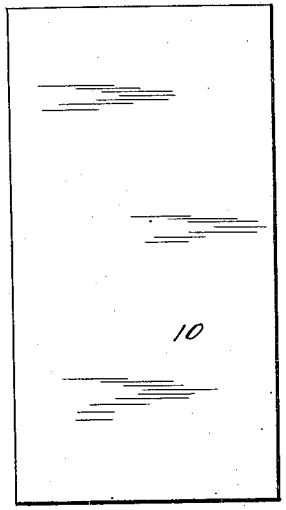
Figure 3:
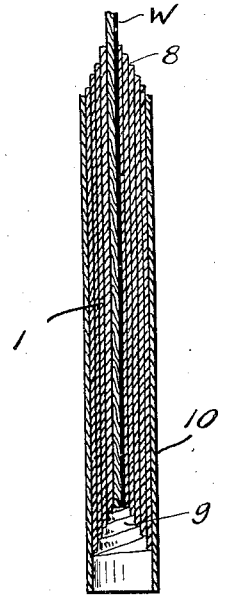
Figure 1A:
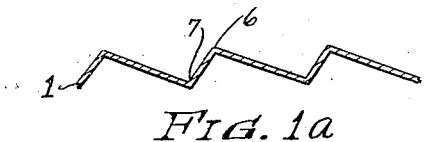
Figure 6:
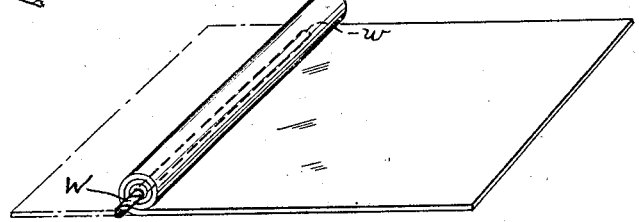
Figure 4:
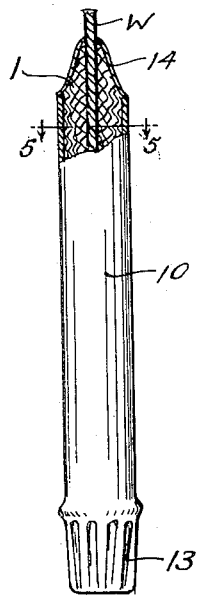
Figure 5:
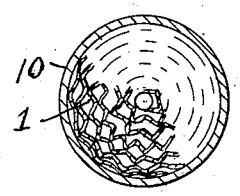
Figures 14, 15:
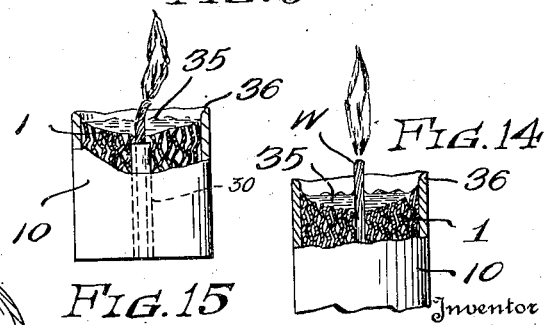

In the drawings, Figs. 1 and 2 are illustrative steps in the method of making the preferred form of candle; Fig. 1a is a sectional detail of one of the materials used, see line 1a—1a in Fig. 1; Fig. 3 is the diagrammatic illustration in the nature of a cross-sectional view of a candle made in accordance with the method contemplated; Fig. 4 is a side elevation of the completed candle, partly broken away at the top to show the internal structure in detail; Fig. 5 is a cross-sectional view taken substantially along the line 5—5 on Fig. 4; Fig. 6 is a diagrammatic perspective view, further illustrating one of the steps of making the candles in accordance with this invention; Fig. 7 is a side elevation of a candle partly broken away at the top portion, and made in accordance with Fig. 6; Figs. 8 and 9 are diagrammatic perspective views of other suitable forms of sheets of material for making the candle; Fig. 8a is a transverse cross-sectional view of a candle made by using the sheet shown in Fig. 8; Fig. 9a is a fragmentary longitudinal cross-sectional view of a candle, made by using the sheet shown in Fig. 9; Fig. 10 is a diagrammatic perspective view, showing still another suitable form of sheet material; Fig. 11 is a plan view of a candle element for a modified form of candle; Fig. 12 is a diagrammatic fragmentary longitudinal sectional view of a candle made, using the device of Fig. 11; Fig. 13 is a fragmentary longitudinal central cross-sectional view of still another form of candle; Fig. 14 is a cross-sectional view of a candle, made in accordance with this invention, and illustrating what takes place when the candle burns, and Fig. 15 is a central sectional view through the base of a candle, incorporating one form of a device for decreasing the fire hazard commonly attending the use of candles.

Referring in detail to the drawings, and first to Figs. 1 to 4, a suitable blank or section of material to form at least part of the candle is indicated at 1. This may be suitably cut, for example, bias-cut, from a long sheet of material of the proper width, the width being determined by the length of candle desired. Such sheet is indicated at 1' in broken lines. The blank 1 may comprise what is known in the art of Bee Culture as "comb foundation". This material consists in an embossed sheet of fairly thin wax, ordinarily largely beeswax, and consists in a multiplicity of hexagonal figures 5 with an alternate arrangement of raised and lowered effects in simulation of the natural honey-comb base. In Fig. 1a the raised portions of the pattern are indicated at 6, and the depressed portions at 7. This particular pattern and embossed formation is given only by way of a suitable example.

Assuming material, such as just described, is used, to form the central body of the candle, a suitable wick shown at W of suitable length is rolled up in the sheet, starting say at the left-hand edge of the sheet as shown in Fig. 1. The result of rolling up the wick in a sheet cut on the bias, as shown, will be substantially as illustrated in Fig. 3,—that is to say, the sheet material 1 will roll up into a substantially cylindrical member, having a protruding cone, as at 8, and a conical recess, as at 9. The manner in which the rolled up comb foundation provides a multiplicity of cells that are more or less disconnected is obvious, and is more or less diagrammatically illustrated in Figs. 4, 5 and 14. The comb foundation crushes, to some extent, and the cells are therefore very irregular in actual practice. This is immaterial, insofar as it affects the function of the candle. The elongated candle body, made as above described, is now preferably encased in a tube of suitable wax material, preferably largely beeswax. To do this, a substantially seamless tube of wax may be made, and the comb foundation cylinders slipped or pressed in, or the casing may be made by wrapping the comb foundation cylinder in a suitable section of smooth rolled sheet wax.

A suitable sheet of smooth rolled wax is shown in Fig. 2 at 10, which may be simply wrapped around the comb foundation cylinder in as many layers as required, depending upon the thickness of the sheet and the weight of casing desired. Preferably, the upper edge of the sheet 10 is even with the base of the protruding cone 8, and the lower edge extends materially beyond the base portion of the comb foundation cylinder. The last mentioned device has an advantage, namely that it decreases the cost of the candle of a given length. In other words, by the simple device of extending the tube beyond the inner body, considerable wax may be saved in making, say a standard length of candle.

It will be noted that the wick W, (Figs. 3, 4 and 7, for example), terminates above the base of the candle. One advantage of this is that the candle will stop burning before it is entirely consumed, thereby reducing the fire hazard to some extent, by predetermining at what point the candle will be extinguished.

After the casing tube is in place, the candle may be properly shaped and decorated, as in a suitable mold or die, to provide the desired surface finish. For example, the general exterior surfaces of the candle may be formed truly cylindrical in a mold, and likewise the bottom end of the candle may be formed as with the taper effect, shown in Fig. 4, at 13. To finish the tip of the candle, the conically protruding comb foundation material may be encased in a suitable sheath 14 of wax or the like, as by dipping the end in molten wax. The tip may be properly formed in the same mold which finishes the general exterior surface and effects the conventional base taper at 13.

It will be understood that the encasing tube for the cellular body may also be made by dipping the comb foundation cylinder in the ordinary way. In any case, the material for the casing may be hardened to raise the melting point thereof, for example by the addition of carnauba wax. However, in the case of rolled sheet wax, this, as has been previously mentioned, is hardened to an appreciable extent by the rolling process, and the melting point raised.

Fig. 6 illustrates a simple embodiment of the invention, in one phase thereof, wherein the wick is simply rolled up in smooth rolled sheet wax or wax composition. This figure illustrates the manner in which the wick may be terminated, short of the lower end of the candle. The wick is simply placed on the sheet with one end spaced from the edge of the sheet, as at W. The resulting candle is shown in Fig. 7, and this may, of course, be finished up in the manner suggested in Fig. 4. The advantages of the simpler form of candle are that the candle is stronger by reason of the greater density of rolled material, as compared to the result of casting or dipping, and the candle will have less tendency to bend over in warm temperature. Further, of course, the greater strength tends to minimize breakage.

Fig. 8 illustrates a sheet of wax or wax composition, which has an embossed effect on one side only, the other side being smooth. As shown, there are embossed ridges at 15 (illustrated only at the left-hand portion shown in full lines). This illustration is mainly for the purpose of showing possibly the simplest manner of obtaining the cellular effect, for the central body of the candle. The candle, when rolled up and formed, may be pressed into cylindrical form, and the cross-sectional arrangement will be approximately as shown in Fig. 8a. Here the recesses 16 appear toward the center of the candle between the raised ridges 15 and the adjacent smooth surfaces of the superposed layer. It will be noted that toward the exterior of the candle, the plain and corrugated surfaces are merged, as at 17, making a continuous non-cellular casing for the candle.

As a further refinement, (see Fig. 9) a single sheet of wax may be made with embossed effects at one portion, ridges 19 for example, and entirely smooth on both sides at another portion, indicated at 20. Such sheet may be rolled up around the wick, beginning at the left margin, and rolling toward the entirely smooth portion, resulting in the candle shown diagrammatically in Fig. 9a. The smooth portion 20 may be rolled down to substantially a feather edge if desired, whereby the candle will ordinarily be substantially round without requiring subsequent finish, as in a mold.

Fig. 10 illustrates still another manner in which the rolled sheet wax may be embossed on one side only. Here there are simple criss-cross ridge effects at 22. The candle made up of a sheet, such as shown in Fig. 10, will be substantially the equivalent of the comb foundation candle body, previously described, and the longitudinal and transverse cross-sectional effects of such candle will approximate both Figs. 8a and 9a.

As a further illustration of the essential inventive thought, the cellular effect of the interior body of the candle may be obtained by transverse laminations of embossed wax material, such as shown in Fig. 11. For example, embossed wax discs 25, having central openings at 26 for the wick, may be assembled onto the wick to form a cylinder of the proper length, after which the assembled cylinder may be rolled up or otherwise encased in a tube 27 of wax, or wax composition. (See Fig. 12.)

Still another way in which the cellular body may be provided is by forming the wax of spongy character. This may be done by violently steaming the wax, or, as a matter of fact, the molten wax may be impregnated with carbon gas. A candle made in this manner is illustrated in Fig. 13. Here the central body has small recesses or pockets at 30, formed for example by gas bubbles, and the outer tube 31 may be made in any of the various ways heretofore suggested.

Candles made substantially in accordance with any of the modifications heretofore described, have in addition to greater strength, the advantage over prior practices in that a deeper cup will be formed as the candle burns, which will eliminate, to a large extent, the tendency for the candle material to drip over the edge and run down the sides. It is obvious that by reason of the air spaces, the melted candle material will run into these, as they are successively presented to the molten candle material. The more compact outer shell does not yield to the effort of heat as readily as the interior body portion of the candle, whether or not this outer shell is specially treated. The candle burns approximately as illustrated in Fig. 14, the molten wax 35 being retained by the continuous rim 36 of the outer shell which, as will be obvious, lags in melting.

Referring to Fig. 7 it will be seen that when the candle burns to the base of the wick, it will, of course, go out, leaving an appreciable length of candle unburned, say an inch or two. This eliminates fire hazard to a great extent. Experiments have demonstrated however, that sometimes the wick, if unsupported at its lower end except by the wax, has a tendency to fall off to one side of the candle when the wax reaches such lower end of the wick. To prevent this, I propose to employ the simple device of making the lower end of the wick in such manner that it will not support a flame. The most suitable materials for such device are such as have low heat conductivity and are impervious to the passage of melted wax. The best form of device I have so far discovered, is that of simply wrapping the lower end of the wick in paper or slipping it into a tube of paper having a fairly smooth dense surface. Fig. 15 may be taken to illustrate such wrapping of paper, this being indicated at 30. When the wick has burned down and becomes charred adjacent the upper end of the tube, the candle will become extinguished of itself.

Still another device which I have used, is to dip the lower end of the wick, or otherwise impregnate it with a substance such as silicate of soda or tungstate of magnesium either of which will render the lower end of the wick non-porous so that it will not support a flame in the candle. I may of course use instead, metallic ferrules or other supports either inside or outside of the wick, and these ferrules or the like, will, of course, not support the flame after the melted wax reaches a point somewhat below their upper ends. Other devices the substantial equivalent of the above, may of course also be used.

Various correlative inventions embodying part of the above described principles are described and claimed in my copending applications: Serial No. 543,045, filed June 9, 1931—Processional candle, and Serial No. 606,807, filed April 22, 1932—Candle and method of making same. Said applications are continuations, in part, of the present application.

I claim:

1. In a candle, a wick, and spirally laminated solid fuel material enveloping the wick.

2. In a candle, a wick, and an elongated wick supporting body of solid fuel material incorporating a plurality of air pockets spaced longitudinally of the body by interposed web formations of said material.

3. A candle comprising a wick, and solid fuel material enveloping the wick, said material incorporating a multiplicity of openings superposed radially in such manner that heat, conducted from substantially all portions of the outer surface inwardly toward the wick by the said material, is constrained to follow tortuous paths, whereby the candle resists bending in relatively warm temperatures.

4. A candle, comprisng a main fuel supplying body, with relatively small cells or pockets distributed therethrough and spaced longitudinally thereof by intervening body material, said cells being adapted to receive portions of the melted fuel as the candle is consumed, and to retain such portions in substantially close proximity to the projecting portion of the wick.

5. The method of making a candle, comprising rolling material such as wax, into a sheet to increase the density and strength of such material, and spirally wrapping such sheet on itself to form a fuel supplying body.

6. The method of making a candle, which includes working sheet wax or the like to impress therein a plurality of depressions, and spirally wrapping the sheet on itself to form the candle body, whereby the body will contain a plurality of pockets.

7. A candle, comprising laminations of sheet solid fuel material in enveloping relation to the wick, portions of such sheet material being formed to provide a plurality of cavities in the interior of the candle body, and other portions being formed to provide a substantially non-cellular candle surface finishing envelope.

8. A candle, comprising a wick and fuel supplying body, the body including successive layers of wax comb foundation enveloping the wick.

9. A candle, comprising a wick, an inner fuel supplying body, enveloping the wick, and an outer finish and reinforcing layer of fuel supplying material enveloping the inner body and projecting beyond the same at the base to form a support for the candle.

10. A candle, comprising a wick, and a fuel supplying body, the latter providing a plurality of substantially disconnected, vertically spaced air pockets with relatively thin walls, whereby, as the walls of the different pockets are successively exposed to the heat of the flame, the body material will melt rapidly in proximity to the wick and form a deep central cup for the reception of melted fuel supplying material.

11. A candle, comprising a wick, and fuel supplying body material surrounding the wick, the body material being formed to provide a plurality of angular substantially disconnected pockets with thin walls disposed in various angular relationship to each other, whereby the successive exposure and melting of such thin walls variously presented to the heat of the flame as the candle burns will result in forming a deep fuel cup for melted body material in proximity to the wick.

12. A candle comprising a wick, an elongated wick supporting core member of solid fuel material incorporating a multiplicity of air spaces separated from each other by relatively thin walls of said material, and an enveloping tubular body of non-cellular solid fuel material of substantially uniform thickness retaining said core, whereby the fuel material near the flame will be rapidly reduced to fluid state while the outer material uniformly resists such reduction to maintain a high brim.

13. A candle comprising a wick, and solid fuel material enveloping the wick, said material incorporating a multiplicity of relatively small openings, a plurality of which are arranged about the wick close thereto, and a plurality being disposed in surrounding relation to the first plurality, forming a cellular interior body which will melt rapidly close to the wick when the candle is lighted to thereby form and maintain a deep central fuel cup for retaining the melted fuel at the base of the projecting end of the wick.

14. A candle comprising solid fuel material and a wick, the inner body of said material incorporating a multiplicity of air cells spaced from each other lengthwise of the wick and spaced different distances radially from the wick as well, by intervening walls of said solid fuel material.

15. The method of making candles comprising working solid fuel material under pressure sufficient to condense and strengthen the same, and incorporating the worked material into the candle structure while still in solid form.

In testimony whereof, I hereunto affix my signature.

HUBER H. ROOT.